(12) United States Patent
Schmidt

(10) Patent No.: US 7,417,958 B2
(45) Date of Patent: Aug. 26, 2008

(54) METHOD FOR IDENTIFYING A CONTROL ELEMENT

(75) Inventor: Hartmut Schmidt, Grossbottwar (DE)

(73) Assignee: ALCATEL, Paris (FR)

( * ) Notice: Subject to any disclaimer, the term of this patent is extended or adjusted under 35 U.S.C. 154(b) by 565 days.

(21) Appl. No.: 11/051,183

(22) Filed: Feb. 7, 2005

(65) Prior Publication Data

US 2005/0207352 A1   Sep. 22, 2005

(30) Foreign Application Priority Data

Mar. 18, 2004   (EP) .................................. 04290739

(51) Int. Cl.
*H04L 12/28*   (2006.01)

(52) U.S. Cl. ..................... 370/254; 370/257; 370/389; 709/220; 709/245

(58) Field of Classification Search ................. 370/218; 709/245

See application file for complete search history.

(56) References Cited

U.S. PATENT DOCUMENTS

| | | | |
|---|---|---|---|
| 5,706,440 A |   | 1/1998 | Compliment et al. |
| 6,115,545 A | * | 9/2000 | Mellquist ..................... 709/220 |
| 6,160,796 A | * | 12/2000 | Zou ............................ 370/257 |
| 6,982,953 B1 | * | 1/2006 | Swales ........................ 370/218 |
| 2003/0140168 A1 | * | 7/2003 | Peshkin et al. ............... 709/245 |
| 2004/0010627 A1 | * | 1/2004 | Ellis et al. .................... 709/250 |
| 2004/0081104 A1 | * | 4/2004 | Pan et al. ..................... 370/254 |
| 2005/0088979 A1 | * | 4/2005 | Mehra .......................... 370/254 |
| 2006/0045079 A1 | * | 3/2006 | Bahls et al. .................. 370/389 |

FOREIGN PATENT DOCUMENTS

| | | | |
|---|---|---|---|
| EP | 1 276 275 A | 1/2003 |
| WO | WO 02/37262 A | 5/2002 |

* cited by examiner

*Primary Examiner*—Hassan Kizou
*Assistant Examiner*—Jeffrey M Rutkowski
(74) *Attorney, Agent, or Firm*—Sughrue Mion, PLLC

(57) ABSTRACT

A method of identifying a control element of a telecommunication system as well as a telecommunication system and a control element for executing this method. The telecommunication system has a plurality of control elements, wherein the control element are connected via respective predefined ports with respective predefined Ethernet switches of a communication network connecting elements of the telecommunication system. The control element sends a request for determining its identification to an Ethernet switch. The Ethernet switch determines the position of the control element in the communication network based on the position of the Ethernet switch within the communication network and based on the port, the control element is connected with the Ethernet switch. It replies position information to the control element. The control element uses an identification based on the received position information for identifying the control element against other elements of the telecommunication system.

13 Claims, 1 Drawing Sheet

METHOD FOR IDENTIFYING A CONTROL ELEMENT

The invention is based on a priority application EP 04290739.4 which is hereby incorporated by reference.

BACKGROUND OF THE INVENTION

The present invention relates to a method for identifying a control element of a telecommunication system towards another element of the telecommunication system as well as a telecommunication system and a control element for executing this method.

A telecommunication system, for example an exchange or switching node of a telecommunication network, contains a plurality of interacting control elements controlling and managing the functionalities of the telecommunication system. As in a clustered computing system, every control element needs to be loaded with a predefined software package. Therefore, a booting network element needs to know his own identity to obtain its appropriate software package.

Typically, the identity is retrieved from the physical design by means of environmental interfaces. Further, when the system is build on inhomogeneous equipment practice, there is no unique way to build the identity. For example, a module in a CompactPCI part relies on information provided by the shelf, namely the Chassis ID and Slot ID (ID=Identification).

To boot a network element within such kind of environment, it is necessary to link predefined software packages with these identities. An operator has to install the control elements, has to program or read out the identities and has to transfer these data to the server responsible for providing the appropriate boot-software packages.

SUMMARY OF THE INVENTION

It is the object of the present invention to improve the identification procedure used to identify a control element of a telecommunication system.

The object of the present invention is achieved by a method of identifying a control element of a telecommunication system towards another element of the telecommunication system, wherein control elements of the telecommunication system are connected with Ethernet switches of a communication network connecting elements of the telecommunication system, the method comprising the steps of: connecting the control element via a predefined port with a predefined Ethernet switch of the communication network; sending a request from the control element to the Ethernet switch to determine its identification; determining, at the Ethernet switch, the position of the control element in the communication network based on the position of the Ethernet switch within the communication network and based on the port the control element is connected with the Ethernet switch; replying position information from the Ethernet switch to the control element; and using, at the control element, an identification based on the received position information for identifying the control element against another element of the telecommunication system. The object of the present invention is further achieved by a telecommunication system having a plurality of control elements, wherein the control elements of the telecommunication system are connected via respective predefined ports with respective predefined Ethernet switches of a communication network connecting elements of the telecommunication system, wherein the Ethernet switches respectively comprises a control unit for determining, when receiving a corresponding request from a control element, the position of the control element in the communication network based on the position of the Ethernet switch within the communication network and based on the port the control element is connected with the Ethernet switch; and for replying position information from the Ethernet switch to the control element, and wherein the control elements respectively comprises a control unit for sending, when being connected with a port of an Ethernet switch, a request to this Ethernet switch to determine its identification, receiving position information from the Ethernet switch, and using an identification based on the received position information for identifying the control element against another element of the telecommunication system. The object of the present invention is further achieved by a control element of a telecommunication system, which has a plurality of control elements connected via respective predefined ports with respective Ethernet switches of a communication network connecting elements of the telecommunication system, the control element comprising a control unit for sending, when the control element being connected with a port of an Ethernet switch, a request to this Ethernet switch to determine its identification, receiving position information from the Ethernet switch, the position information specifying position of the control element in the communication network based on the position of the Ethernet switch within the communication network and based on the port the control element is connected with the Ethernet switch, and using an identification based on the received position information for identifying the control element against other elements of the telecommunication system. Thanks to the invention, the identification of control elements is achieved in a efficient and homogeneous way, even in case of inhomogeneous equipment practices. The control elements use the common Ethernet connectivity for determining their geographical position and uniquely identify each control element. It requires non-standard extensions of the management software of the Ethernet switching products and the bootstrap code of the various modules. Every computing node in the telecommunication system does not require any further means to identify its position. This allows an easy integration of new equipment practices in the architecture without additional standard or non-standard requirements. Further, it is not longer necessary to detail the identification of a control element during installation by inputting complex identification numbers into a terminal connected with a boot server, but simply determining the role and identification of a server by plugging its communication cable in a specific port of a specific Ethernet switch. This simples and fastens the installation process of the control element seriously. The invention provides a fast, easy to handle plug and play solution that even improves the reliability and operational availability of the telecommunication system.

Further advantages are achieved by the embodiment of the invention indicated by the dependent claims.

According to a preferred embodiment of the invention, the control element contacts a software provisioning element of the telecommunication system to obtain an appropriate boot-software package, when having created the identification based on the received position information from the Ethernet switch. The control element uses this identification to identify itself against the software provisioning server and loading a boot-software package assigned to this identification from the software provisioning server. Such approach guarantees the execution of an automatic boot-procedure as soon as the control element being connected to the communication network.

Preferably, the software provisioning element determines in parallel the identifications of control elements of the telecommunication system based on data about the port the control elements are connected with Ethernet switches and the position of these Ethernet switches within the communication network. Data about possible positions of control elements within the communication network may be inputted via an operator terminal or automatically generated within an architecture phase. Further, the assignment of control elements to network positions may be done automatically by the software provisioning element or by a specific architecture tool executed on an external computer. Due to this approach, the boot-software packages are automatically linked to network elements defined by their respective connection of a predefined port of a predefined Ethernet switch.

Further, it is possible to apply this approach not only to boot-data, but also to any further data assigned by an element of the telecommunication system to a control element of the telecommunication system.

Preferably, the Ethernet switches are not only used for determining the position of a control element, but also used for providing a communication service between elements of the telecommunication system. Preferably, a control element selects a random MAC address (MAC=Medium Access Control) and sends a request with the selected MAC address as source address to the Ethernet switch the control element is connected with. This request requests the determination of the identification of the control element. The Ethernet switch determines the port via which it has received this request and determines by means of this data the position of the control element in the communication network. By means of this position information, the control element calculates an MAC address according to a predefined scheme, e.g. known to the software provisioning element. Then, it sends a message with the calculated MAC address as source address to another element of the telecommunication to identify the control element against this element of the telecommunication system. This approach improves the efficiency of the system. The reuse of existing mechanisms for the purpose of control element identification reduces the implementation costs of the invention.

Preferably, the Ethernet switch determines its position in the network by means of a spanning tree algorithm. Further, manageable Ethernet switches are used for implementing the invention. These approaches cause further cost savings.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE DRAWING

Figure 1:
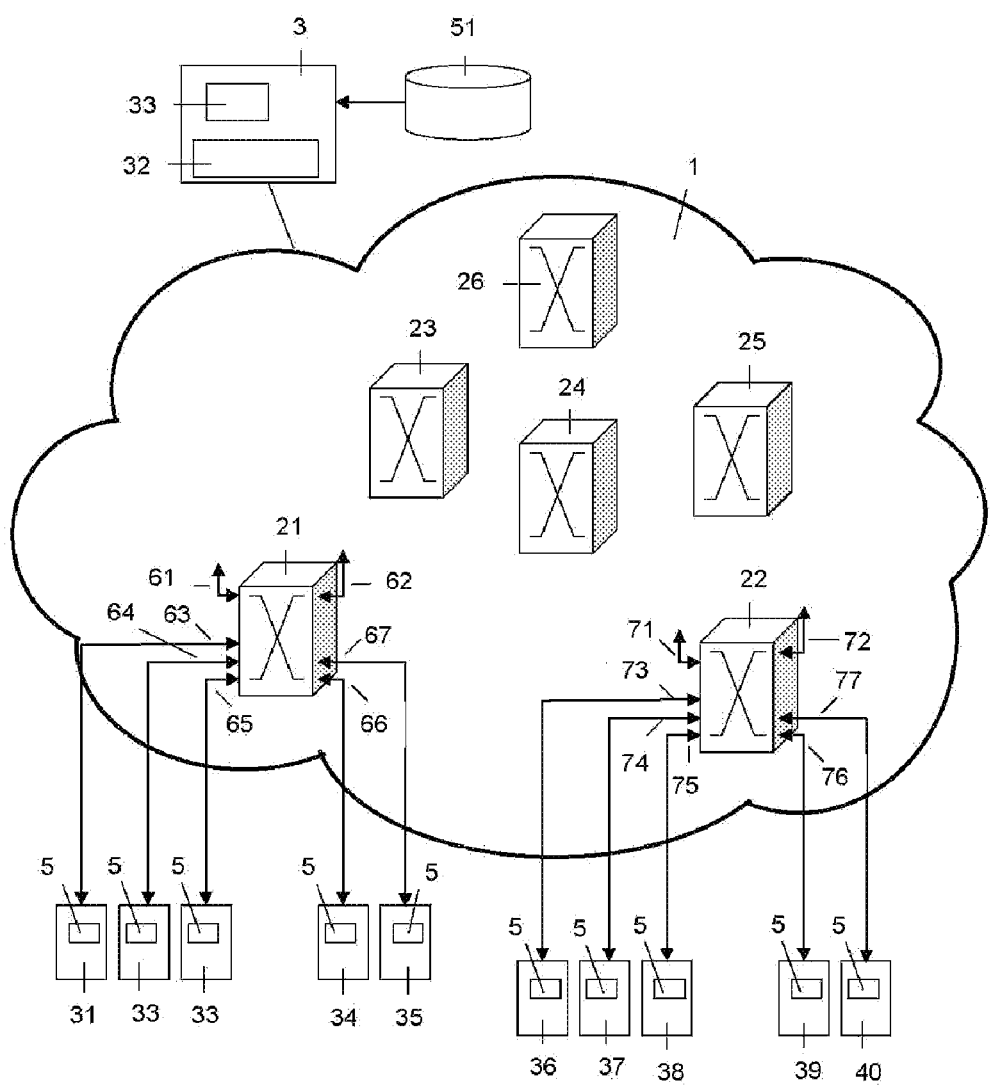
FIG. 1 is a block diagram of a telecommunication system according to the invention.

FIG. 1 exemplifies a telecommunication system with a plurality of control elements 31 to 40, a communication network 1 and a software provisioning system 3.

The telecommunication system exemplified by hands of FIG. 1 is, for example, an exchange or any other kind of switching or service node of a telecommunication network. Such kind of switching systems is composed of a plurality of interacting control elements controlling functions of the switching system, for example call establishment and call routing functions.

FIG. 1 shows some of these control elements, namely the control elements 31 to 40. The control elements of the switching system are connected via a communication network 1 used for the exchange of control information between elements of the switching system. Further, some or all of the control elements of the telecommunication system are in addition connected with a switching network (not shown) used to switch the bearer traffic of the telecommunication system. It is possible to use this switching network to transfer all or a part of the control traffic exchanged between elements of the switching system, too.

The communication network 1 is an Ethernet-based data network composed of several interlinked Ethernet switches. Exemplary, FIG. 1 shows several of these Ethernet switches, namely the Ethernet switches 21 to 26.

The control elements 31 to 40 are composed of one or several processor, connected peripheral components and software programs executed by these processors. For example, the network elements 31 to 40 are universal computers or specialized processor cards equipped with specific peripheral components for providing specific telecommunication related tasks. The control elements 31 to 40 are connected with Ethernet switches of the communication network 1. According to the embodiment illustrated by FIG. 1, the control elements 31 to 35 are connected with the ports 63, 64, 65, 66 and 67 of the Ethernet switch 21, respectively. Ethernet ports 61 and 62 of the Ethernet switch 21 are connected with other Ethernet switches, for example with the Ethernet switches 23 and 24. These ports provide the connection to a number of second stage Ethernet switches representing the core Ethernet switching functionality of the communication network 1. The control elements 36 to 40 are connected with ports 73, 74, 75, 76 and 77 of the Ethernet switch 22, respectively. Ports 71 and 72 of the Ethernet switch 22 are connected with second stage Ethernet switches of the communication network 1, for example with the Ethernet switches 24 and 25.

The control elements 31 to 40 are connected via a connection cable or via a specific plugging system with the Ethernet switches 21 and 22. For example, the control element 31 is a computer system which is connected via a conventional connection cable with a port of the Ethernet switch 21. For example, the control elements 32 and 35 are specific, telecommunication related processor cards plugged in a rack and automatically connected with the respective ports of the Ethernet switch 21 when pushed in the dedicated slot.

From functional point of view, each of the control elements 31 to 40 comprise a control unit 5 executing a dedicated boot procedure. The functionalities of the control unit 5 are provided by the execution of a specific software program on the hardware platform of the control elements 31 to 40.

The software provisioning server 3 is composed of one or several interlinked computers, a software platform and application programs executed on the system platform of the software provisioning server 3. From functional point of view, it comprises a communication unit 32 for exchanging data via the communication network 1 and a control unit 33 that provides a boot service for control elements connected with the communication network 1. Further, the software provisioning server 3 receives data from data base 51 storing a number of software packets assigned to control elements of the telecommunication system.

In the following, the booting procedure of the control elements 31 to 40 is exemplified by hand of the booting procedure of the control element 31.

If the control element 31 receives a boot request or being connected with the Ethernet switch 21, the control unit 5 selects a random MAC address (MAC=Medium Access Control). Then, it sends a message to the Ethernet switch 21. This message includes the selected random MAC address as source address and contains information triggering the Ethernet switch 21 to determine position information of the control element 31.

The Ethernet switch 21 is a manageable Ethernet switch which provides an onboard CPU with a software control interface (CPU=Central Processing Unit). The Ethernet switch 21 is equipped with an additional software program executed on this CPU and providing the additional functionalities of a position identification control unit when executed on this CPU. The functionalities of these control unit are specified in the following:

When receiving the aforementioned message from the control element 31, the position identification control unit detects the port ID where it receives the message. Further, the position identification control unit knows the position of the Ethernet switch 21 within the communication network 1 through further communications between the Ethernet switch 21 and the further Ethernet switches of the communication network 1. For example, the position identification control unit uses a spanning tree algorithm for determining the position of the Ethernet switch 21 within the communication network 1. Then, the position identification control unit replies the determined position information of the control element 31 to the control element 31, i.e. it replies information about the port the control element 31 is connected with the Ethernet switch 21 and the position of the Ethernet switch 21 within the communication network 1. The control unit 5 will then compute an individual MAC address from this position information for further identification of the control element 31 within the telecommunication system.

The communication between the control unit 5 and the aforementioned control units of the Ethernet switch 21 is based on produces the IEEE802.1d standard protocol for BPDU which is extended to provide the aforementioned functionalities (BPDU=Bridge Protocol Data Unit). But, it is also possible that another protocol is designed for this purpose.

In a next step, the control unit 5 sends a boot request via the communication network 1 to the software provisioning server 3. This boot request uses the calculated MAC address as source address and thereby identifying the control element 31 towards the software provisioning server 3. The control unit 33 of the software provisioning server 3 uses the source MAC address included in the boot request to determine the software packet assigned to the control element 31. For example, it compares the received MAC address with a list of pre-stored MAC addresses, wherein each of these pre-stored MAC addresses is linked with one of the software packages stored in the database 51.

It is possible that the list of pre-stored MAC addresses is inputted by an operator. Preferably, the control unit 33 automatically creates the list of pre-stored MAC addresses within a control system architecture phase wherein it defines the necessary control element of the telecommunication system, assigns these control elements to positions within the communication network 1 and calculates their respective MAC address based on their position and the address calculation scheme used by the control units 5.

In the following, the control unit 33 downloads the selected software package from the data base 51 to the control element 31. Then, the control unit 5 initiates the installation of this software package on the control element 31. Further, it is possible to use the identification of the control element 31 determined by help of the aforementioned procedure for any other application. For example, this identification is used in the interaction between the control elements 31 to 40 to identify the control element 31 towards the other control elements 32 to 40 of the telecommunication system.

Further, it is also possible that the control unit 5 does not use a specifically calculated MAC address as identifier, but uses any other kind of identifier calculated based on the received position information and transported in any kind of message exchanged with other elements of the telecommunication system.

The invention claimed is:

1. A method of identifying a control element of a telecommunication system with respect to another element of the telecommunication system, wherein control elements of the telecommunication system are connected with Ethernet switches of a communication network connecting elements of the telecommunication system, the method comprising:

connecting the control element via a predefined port with a predefined Ethernet switch of the communication network;

sending a request from the control element to the Ethernet switch for position information of the control element;

determining, at the Ethernet switch, the position of the control element in the communication network based on the position of the Ethernet switch within the communication network and based on the port the control element is connected with the Ethernet switch;

replying position information from the Ethernet switch to the control element; and using, at the control element, an identification based on the received position information for identifying the control element with respect to another element of the telecommunication system.

2. The method of claim 1, wherein the method further comprises assigning, at the other element of the telecommunication system, data to control elements defined by their respective connection to a predefined port of a predefined Ethernet switch.

3. The method of claim 1, wherein the method further comprises contacting a software provisioning element of the telecommunication system to obtain an appropriate software package for the control element; using the identification to identify the control element against the software provisioning element; and loading a software package assigned to the identification from the software provisioning element to the control element.

4. The method of claim 3, wherein the method further comprises determining, at the software provisioning element, the identification of a control element based on data about the port the control element is connected with an Ethernet switch and the position of this Ethernet switch within the communication network; and using the determined identification to assign a software packet to a boot request.

5. The method of claim 1, wherein the method further comprises allocating a random MAC address to the control element; and sending a request with the allocated MAC address as source address from the control element to the Ethernet switch, the request requesting the position information of the control element.

6. The method of claim 1, wherein the method further comprises calculating, at the control element, a MAC address according to a predefined scheme and according to the received position information; and sending a message with the calculated MAC address as source address to another element of the telecommunication system to identify the control element with respect to said another element of the telecommunication system.

7. The method of claim 1,
wherein the Ethernet switch determines position of the Ethernet switch in the communication network by a spanning tree algorithm.

8. The method of claim 1,
wherein the Ethernet switch is a manageable Ethernet switch.

9. A telecommunication system having a plurality of control elements, wherein the control elements of the telecommunication system are connected via respective predefined ports with respective predefined Ethernet switches of a communication network connecting elements of the telecommunication system, wherein the Ethernet switches respectively comprises a control unit for determining, when receiving a corresponding request from a control element which is connected via a port of the Ethernet switch with the Ethernet switch, the position of the control element in the communication network based on the position of the Ethernet switch within the communication network and based on the port the control element is connected with the Ethernet switch and for replying position information from the Ethernet switch to the control element, and wherein the control elements respectively comprises a control unit for sending, when being connected with a port of an Ethernet switch, a request to the Ethernet switch for position information of the control element, receiving position information from the Ethernet switch and using an identification based on the received position information for identifying the control element against other elements of the switching system.

10. A control element of a telecommunication system, which has a plurality of control elements connected via respective predefined ports with respective predefined Ethernet switches of a communication network connecting elements of the telecommunication system, the control element comprises a control unit for sending, when the control element being connected with a port of an Ethernet switch, a request to this Ethernet switch for position information of the control element, receiving position information from the Ethernet switch, the position information specifying the position of the control element in the communication network based on the position of the Ethernet switch within the communication network and based on the port the control element is connected with the Ethernet switch and using an identification based on the received position information for identifying the control element against other elements of the telecommunication system.

11. The method of claim 1, wherein the control element controls at least some of functionalities of the telecommunication system and wherein the telecommunication system comprises inhomogeneous control elements.

12. The method of claim 1, wherein functionality of the control element is determined from said used identification.

13. The method of claim 1, wherein said position information comprises at least one of a switch/bridge ID and a port ID.

\* \* \* \* \*